United States Patent [19]

Claussen

[11] Patent Number: 4,610,803

[45] Date of Patent: Sep. 9, 1986

[54] AZO DYESTUFFS AND LIQUID-CRYSTAL MATERIAL CONTAINING AZO DYESTUFFS

[75] Inventor: Uwe Claussen, Leverkusen, Fed. Rep. of Germany

[73] Assignee: Bayer Aktiengesellschaft, Leverkusen, Fed. Rep. of Germany

[21] Appl. No.: 560,018

[22] Filed: Dec. 9, 1983

[30] Foreign Application Priority Data

Dec. 10, 1982 [DE] Fed. Rep. of Germany ....... 3245751

[51] Int. Cl.$^4$ .......................... G02F 1/13; C09K 3/34
[52] U.S. Cl. .................. 252/299.1; 350/349; 534/577
[58] Field of Search ...................... 252/299.1; 350/349; 260/169, 170, 172, 173, 178, 180, 166, 168; 534/577

[56] References Cited

U.S. PATENT DOCUMENTS

| | | | |
|---|---|---|---|
| 3,930,793 | 1/1976 | Birke et al. .......................... | 260/174 |
| 4,128,497 | 12/1978 | Cole, Jr. et al. ................. | 252/299.1 |
| 4,137,193 | 1/1979 | Osman et al. ..................... | 252/299.1 |
| 4,145,114 | 3/1979 | Coates et al. ..................... | 252/299.1 |
| 4,308,161 | 12/1981 | Aftergut et al. .................. | 252/299.1 |
| 4,308,162 | 12/1981 | Cole, Jr. et al. ................. | 252/299.1 |
| 4,308,163 | 12/1981 | Aftergut et al. .................. | 252/299.1 |
| 4,359,398 | 11/1982 | Cole, Jr. et al. ................. | 252/299.1 |
| 4,394,070 | 7/1983 | Brown et al. ..................... | 252/299.1 |
| 4,411,812 | 10/1983 | Aftergut et al. .................. | 252/299.1 |
| 4,426,312 | 1/1984 | Claussen ........................... | 252/299.1 |
| 4,519,935 | 5/1985 | Claussen ........................... | 252/299.1 |

FOREIGN PATENT DOCUMENTS

| | | | |
|---|---|---|---|
| 0055838 | 7/1982 | European Pat. Off. ......... | 252/299.1 |
| 59166 | 9/1982 | European Pat. Off. ......... | 252/299.1 |
| 67354 | 12/1982 | European Pat. Off. ......... | 252/299.1 |
| 76633 | 4/1983 | European Pat. Off. ......... | 252/299.1 |
| 87248 | 8/1983 | European Pat. Off. ......... | 252/299.1 |
| 98522 | 1/1984 | European Pat. Off. ......... | 252/299.1 |
| 56-57850 | 5/1981 | Japan ................................ | 252/299.1 |
| 58-111884 | 7/1983 | Japan ................................ | 252/299.1 |
| 58-164674 | 9/1983 | Japan ................................ | 252/299.1 |
| 757557 | 8/1980 | U.S.S.R. .......................... | 252/299.1 |

OTHER PUBLICATIONS

Demus, D. et al., Flüssige Kristalle in Tabellen, Ved Deutscher Verlag fur Grundstoffindustrie, Leipzig, pp. 220-221 (1974).

Cognard, J. et al., Mol. Cryst. Liq. Cryst., vol. 68, pp. 207-229 (1981).

Cox, R. J., Mol. Cryst. Liq. Cryst., vol. 55, pp. 1-32 (1979).

*Primary Examiner*—Teddy S. Gron
*Attorney, Agent, or Firm*—Sprung Horn Kramer & Woods

[57] ABSTRACT

Liquid-crystal material containing an azo dyestuff of the formula $$X\mathrm{-}(L\mathrm{-}N\mathrm{=}N)_n\mathrm{-}\underset{R_2}{\overset{R_1}{\bigcirc}}\mathrm{-}\underset{R_3}{\overset{}{\bigcirc}}\mathrm{-}\underset{R_5}{\overset{R_4}{\bigcirc}}\mathrm{-}(N\mathrm{=}N\mathrm{-}M)_m\mathrm{-}N\mathrm{=}N\mathrm{-}B \quad (I)$$

in which

X denotes H, —CN, —CF$_3$, halogen, —OCF$_3$, —COOR$_7$, —OR$_7$, —SR$_7$, —NR$_7$R$_8$ or A—N=N—, L and M denote an optionally substituted 1,4-phenylene radical or an optionally substituted 1,4-naphthylene radical, A and B denote the radical of a coupling component, R$_1$, R$_2$, R$_3$, R$_4$, R$_5$ and R$_6$ denote hydrogen, halogen, trifluoromethyl, nitro, alkyl, alkoxy, alkylcarbonyl, alkylthio or alkoxycarbonyl, and m and n denote 0, 1 or 2, subject to the proviso that m+n is 1 or 2, it being also possible for R$_7$ and R$_8$ to denote hydrogen or alkyl, cycloalkyl, aryl and aralkyl which is optionally interrupted by 1–3 non-adjacent O atoms, it being possible for the hydrocarbon radicals mentioned for R$_7$ and R$_8$ to be substituted and, in the case of —NR$_7$R$_8$, together with the inclusion of the N atom, to form a 5-membered to 8-membered ring, and also new azo dyestuffs of the formula (I).

5 Claims, No Drawings

AZO DYESTUFFS AND LIQUID-CRYSTAL MATERIAL CONTAINING AZO DYESTUFFS

The invention relates to new azo dyestuffs and to liquid-crystal material containing azo dyestuffs. The liquid-crystal material is used in displays.

Displays are to be understood here as meaning optoelectronic display elements, which generally consist of two sheets arranged parallel, at a distance of 5–50μ, at least one of which is prepared from a material transparent to light. Electrodes are mounted on the inner sides of the sheets, and the space between them is filled with the liquid-crystal, dyestuff-containing material. The construction and the production of optoelectronic displays is known (Kelker and Hatz, Handbook of Liquid Crystals, page 611 et seq.; 1980).

It is also known that selected dyestuffs which follow the changes of orientation and order in the liquid-crystal material which are caused by the externally applied field can be embedded in the liquid-crystal material (so-called guest-host interaction). This particular property makes suitable dyestuffs scarce, if, as well as the dichroic properties, fastness properties which enable the effect to be utilised industrially are also demanded. Important requirements in this respect are fastness to light, adequate solubility and compatibility with other dyestuffs.

Numerous suitable individual dyestuffs are described in the literature. Thus azo dyestuffs have also been mentioned often (R. H. Cox: Molecular Crystals, Liquid Crystals, 1979, pages 1–32).

These azo dyestuffs generally exhibit a high order parameter. However, their tinctorial strength is seldom adequate and their fastness to light is always too low. As a consequence of this fact, emphasis in the development of usable dyestuffs has shifted to the category of substances constituted by the anthraquinones (see for example, German Offenlegungsschrift 3,028,593, German Offenlegungsschrift 3,009,974 and German Offenlegungsschrift 3,006,744).

It has now been found, surprisingly, that azo dyestuffs of the formula

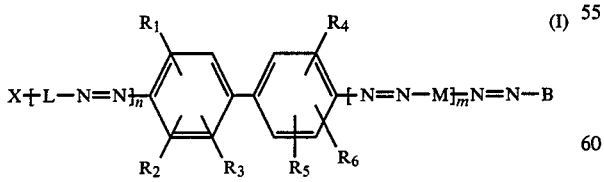

in which
X denotes H, —CN, —CF$_3$, halogen, —OCF$_3$, —COOR$_7$, —OR$_7$, —SR$_7$, —NR$_7$R$_8$ or A—N=N—,
L and M denote an optionally substituted 1,4-phenylene radical or an optionally substituted 1,4-naphthylene radical,
A and B denote the radical of a coupling component,
R$_1$, R$_2$, R$_3$, R$_4$, R$_5$ and R$_6$ denote hydrogen, halogen, trifluoromethyl, nitro, alkyl, alkoxy, alkylcarbonyl, alkylthio or alkoxycarbonyl, and
m and n denote 0, 1 or 2, subject to the proviso that m+n is 1 or 2,
it being also possible for
R$_7$ and R$_8$ to denote hydrogen or alkyl, cycloalkyl, aryl and aralkyl which is optionally interrupted by 1–3 non-adjacent O atoms, it being possible for the hydrocarbon radicals mentioned for R$_7$ and R$_8$ to be substituted and, in the case of —NR$_7$R$_8$, together with the inclusion of the N atom, to form a 5-membered to 8-membered ring, are suitable.

A and B preferably represent the radical of a coupling component of the aromatic or heterocyclic series, particularly preferentially a radical of the benzene, naphthalene or pyrazole series.

The radicals L and M can be substituted, for example, by R$_1$, —OCF$_3$ and/or —SR$_7$.

Liquid-crystal material containing a compound of the formula

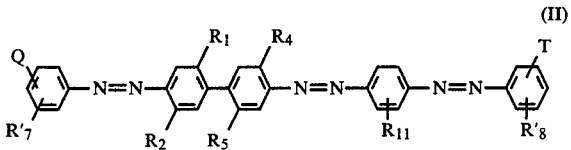

in which
R′$_7$, R′$_8$ and R$_{11}$ denote hydrogen, halogen, cyano, nitro, alkyl or alkoxy and T and Q represent —OR$_7$, —SR$_7$ or —NR$_7$R$_8$, is preferred.

Compounds which are also preferred for use in liquid-crystal material are those of the formula

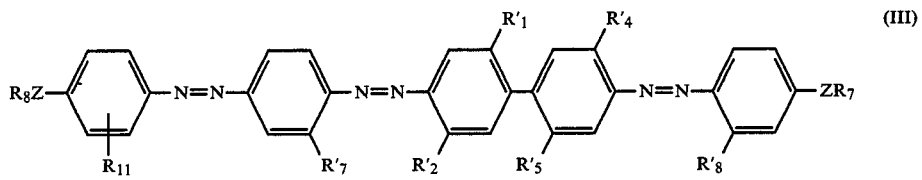

in which
Z denotes an O or S atom and
R′$_1$, R′$_2$, R′$_3$ and R′$_5$ denote chlorine, C$_1$–C$_{10}$-alkyl which can be interrupted by 1–3 non-adjacent O atoms, in particular methyl, and C$_1$–C$_{10}$-alkoxy in which the alkyl chain can be interrupted by 1–3 non-adjacent O atoms, in particular methoxy.

In the substituents of the formulae (I) and (II), halogen preferably denotes chlorine, bromine and fluorine, alkyl preferably denotes C$_1$–C$_6$-alkyl, alkoxy preferably denotes C$_1$–C$_6$-alkoxy, alkylcarbonyl preferably denotes (C$_1$–C$_6$-alkyl)-carbonyl, and alkoxycarbonyl preferably denotes (C$_1$–C$_6$-alkoxy)-carbonyl.

R$_7$ and R$_8$ preferably represent hydrogen, C$_1$–C$_6$-alkyl, cyclopentyl, cyclohexyl, phenyl, naphthyl, benzyl or phenethyl, it being possible for the hydrocarbon radicals mentioned to be substituted, and also preferably represent aryl.

Compounds which are employed particularly preferentially are those of the formula

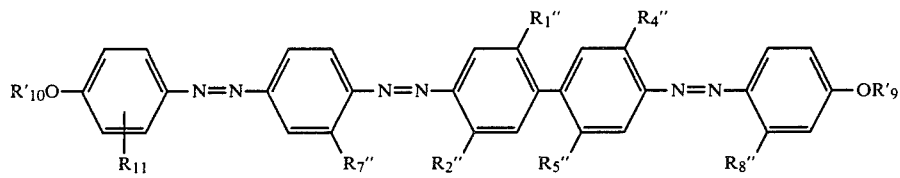

(IV)

in which $R_1''$, $R_2''$, $R_4''$ and $R_5''$ denote halogen, in particular chlorine, hydrogen, $C_1$-$C_4$-alkyl, in particular methyl, or $C_1$-$C_4$-alkoxy, in particular methoxy, and $R'_9$ and $R'_{10}$ denote $C_1$-$C_4$-alkyl, in particular methyl or benzyl which can be substituted in the phenyl nucleus, preferably in the 4-position, by halogen, in particular chlorine, nitro, $C_1$-$C_4$-alkyl, in particular methyl, or $C_1$-$C_4$-alkoxy, in particular methoxy, or denote optionally substituted aminocarbonyl, and $R_7''$ and $R_8''$ represent hydrogen, halogen, in particular chlorine, $C_1$-$C_4$-alkyl, in particular methyl, and $C_1$-$C_4$-alkoxy, in particular methoxy.

Compounds which are employed very particularly preferentially are those of the formula (IV) in which $R_1''=R_5''$ and/or $R_2''=R_4''$.

Compounds which are also employed preferentially are those of the formula in which L' denotes a 1,4-phenylene or 1,4-naphthylene radical which is optionally substituted by $R_1$, —$OCF_3$ and/or —$SR_7$, —OH or —$NH_2$, the OH or $NH_2$ groups being preferably in the o-position in relation to the azo bridge, R denotes $R_1$, —$OCF_3$ or —$SR_7$ and p denotes 1 or 2.

Dyestuffs which are also preferred are those of the formula

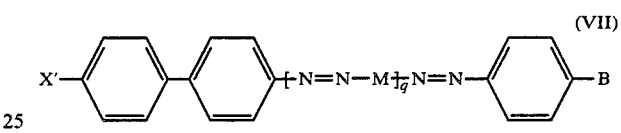

(VII)

in which

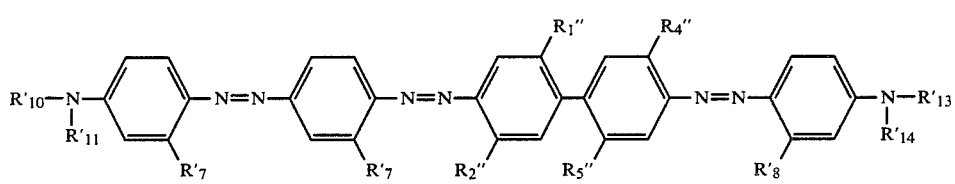

(V)

in which $R'_{10}$, $R'_{11}$, $R'_{13}$ and $R'_{14}$ represent hydrogen, $C_1$-$C_4$-alkyl which can be substituted by hydroxyl, cyano, phenoxy, $C_1$-$C_4$-alkoxy or ($C_1$-$C_4$-akoxy)carbonyloxy, cyclohexyl, phenyl, naphthyl, benzyl, phenethyl, ($C_1$-$C_4$-alkyl)-carbonyl, benzoyl, ($C_1$-$C_4$-alkylamino)-carbonyl and phenylaminocarbonyl, and $R'_{10}$ and $R'_{11}$ or $R'_{13}$ and $R'_{14}$, together with the inclusion of the N atom, can form a 5-membered or 6-membered ring.

Compounds which are employed very particularly preferentially are those of the formula (V) in which $R_1''=R_5''$ and/or $R_2''=R_4''$.

Compounds which are also employed preferentially are those of the formula

X' denotes hydrogen, cyano, —$CF_3$, —$OR_7$, —$OCF_3$, —$COOR_7$ or —$SR_7$ or a halogen atom, in particular F, and q represents 1 or 2.

Finally, dyestuffs which are of particular interest are those of the formula

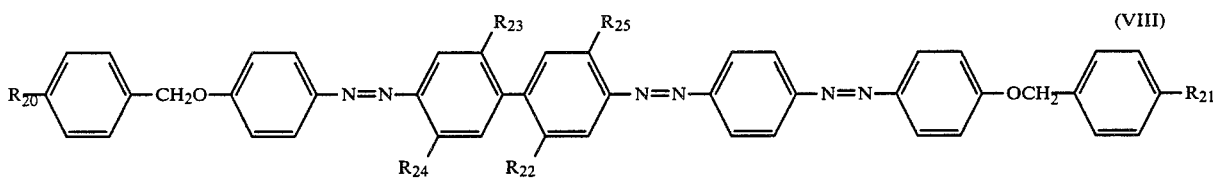

(VIII)

in which $R_{20}$ and $R_{21}$ denote H, —$CH_3$, —$NO_2$ or —Cl and $R_{22}$, $R_{23}$, $R_{24}$ and $R_{25}$ denote H, —$CH_3$, —Cl or —$NO_2$.

The invention also relates to azo dyestuffs of the formulae (I)–(VIII).

These new dyestuffs can be prepared analogously to dyestuffs which are known from the literature. As a rule, the dyestuffs of the formula (I) which are obtained

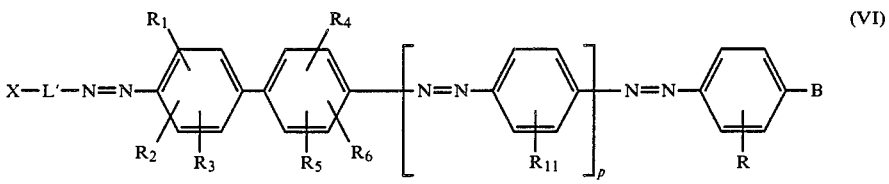

(VI)

in the customary synthesis by diazotisation and coupling are not sufficiently pure for use in displays. On the contrary, it has proved advisable to purify them by chromatographic processes, preferably column or partition chromatography.

The dyestuffs according to the invention can be used in solution in liquid-crystal materials. They are preferably used in mixtures of dyestuffs. Liquid-crystal materials having positive dielectric anisotropy are particularly suitable. The number of variants of mixing is large. Examples which may be mentioned are mixtures of 4-(4-cyanophenyl)-alkylcyclohexanes in which alkyl denotes 25% of propyl, 37% of n-pentyl and 25% of n-heptyl and 12% of 4-(4'-cyanobiphenyl)-n-pentylcyclohexane is used as an additional component, or mixtures of 4-(4'-cyanobiphenyl)-alkyl compounds and 4-(4'-cyanobiphenyl)-alkoxy compounds, for example those in which alkyl denotes 53% of n-pentyl and 25% of n-heptyl and alkoxy denotes 14% of octyloxy, and 4-(4'-cyanoterphenyl)-alkyl compounds, for example those in which alkyl denotes 8% of n-pentyl. Mixtures containing 4-cyanophenylpyrimidines are also suitable. Preferably about 0.01 to about 30% by weight, particularly preferably about 0.5 to about 5% by weight, of the dyestuffs according to formula I are present in the liquid-crystal material.

The dyestuffs and mixtures thereof with other dyestuffs, particularly with anthraquinone dyestuffs, which are dissolved in the liquid-crystal materials can be used in optoelectronic displays.

EXAMPLE 1

31 g of technically pure 4,4'-diamino-2,2'-dimethylbiphenyl sulphate are stirred into 15 ml of concentrated hydrochloric acid and 150 ml of water at 50° C. A further 25 ml of concentrated hydrochloric acid is added and diazotisation is carried out at 0°–5° C., using 7 g of sodium nitrite in 50 ml of water. The diazonium salt is coupled with anilinomethanesulphonic acid at pH 1–2, and the precipitate which has been deposited is filtered off with suction after 2.5 hours.

The paste is washed with water and is cleaved by boiling with 10% sodium carbonate solution, which is complete after 90 minutes. The yellow dyestuff which has been precipitated is filtered off with suction and washed with water until neutral. 31.5 g of this product are dissolved in 130 ml of dimethylformamide and 80 ml of concentrated hydrochloric acid, and the mixture is diazotised with 10.5 g of sodium nitrite in 40 ml of water. After the excess of nitrite has been destroyed, 14 g of phenol are added to the solution and the pH is adjusted to 8–9. After 2 hours, the precipitate is filtered off with suction and extracted by boiling with methanol, and the mixture is filtered while hot. The filtrate gives 4 g of dyestuff, which is etherified in 70 ml of methyl ethyl ketone with 1 g of potassium carbonate, 20 g of chloromethylbenzene and a pinch of iodine for 5 hours at 89°–90° C. The reaction product is poured into water, and the precipitate is filtered off and chromatographed over a silica gel column using a 20:1 mixture of methylene chloride/methanol as the mobile phase.

Two isomeric dyestuffs of the same overall composition $C_{46}H_{36}N_6O_2$ are obtained, of which the first to be eluted has an order parameter S of 0.76 and an absorption maximum at 393 nm, while the second had an order parameter S of 0.73 and an absorption maximum at 395.

In order to determine the order parameter, the dyestuff is dissolved in a nematic phase (TNC 1132, Merck), which is a mixture of substituted phenylcyclohexanes, and the dichroism is measured. This is effected by placing the solution in a cell, the walls of which are provided with an orientation layer and have parallel faces at a distance of $20\mu$. The absorption is measured with polarised light, the polarisation filter being adjusted so that maximum absorption (AII) is obtained; in addition to this experimental value, the minimum absorption (AI) is then produced by rotating the filter through 90°. The order parameter is calculated from the known equation $$S = \frac{\frac{AII}{A\perp} - 1}{\frac{AII}{A\perp} + 2}$$

EXAMPLE 2

If the following diamines: (a) 2,2'-dichloro-4,4'-diaminobiphenyl, (b) 3,3'-dichloro-4,4'-diaminobiphenyl, (c) 3-methyl-4,4'-diaminobiphenyl, (d) 3,3'-dimethyl-4,4'-diaminobiphenyl and (e) 3-nitro-4,4'-diaminobiphenyl, are used in Example 1 instead of 2,2'-dimethyl-4,4'-diaminobiphenyl, the following dyestuffs are obtained, which have the order parameters indicated:

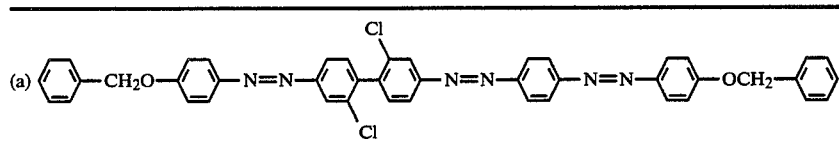

(a) S = 0.76

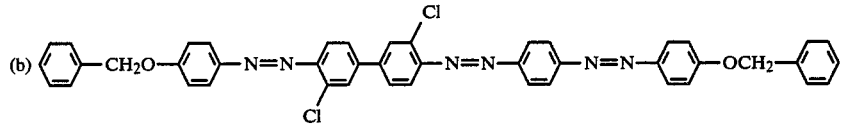

(b) S = 0.74

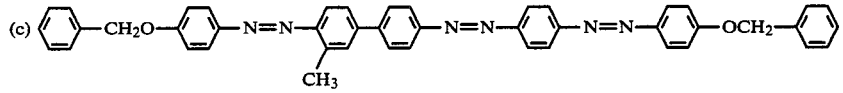

(c) S = 0.76

-continued

| | S |
|---|---|
| (d) 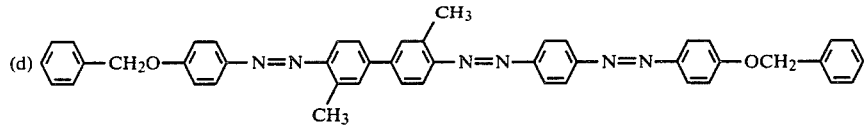 | 0.75 |
| (e) 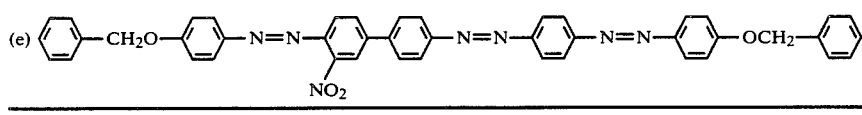 | 0.72 |

EXAMPLE 3

If the following compounds (a) 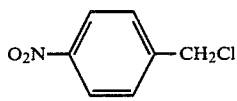

(b) 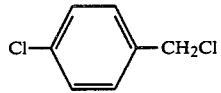

(c) 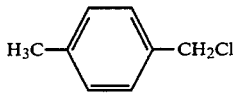

are used in Example 1 instead of chloromethylbenzene, the following dyestuffs are obtained, the order parameters (S) of which are shown:

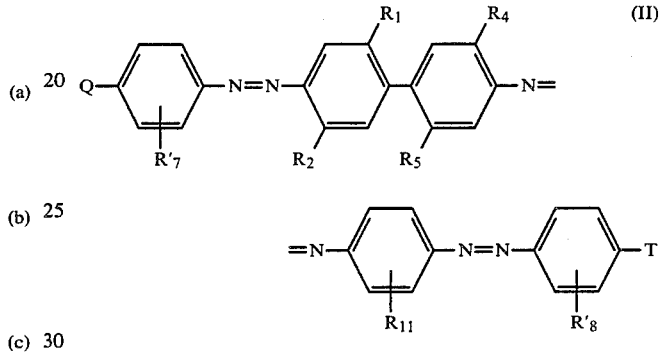

in which
R'$_7$, R'$_8$ and R$_{11}$ denote hydrogen, halogen, cyano, nitro, alkyl or alkoxy and
T and Q represent —OR$_7$, —SR$_7$ or —NR$_7$R$_8$ and
R$_1$, R$_2$, R$_4$ and R$_5$ denote hydrogen, halogen, trifluoromethyl, nitro, alkyl, alkoxy, alkylcarbonyl, alkylthio or alkoxycarbonyl and

| | S |
|---|---|
| (a) 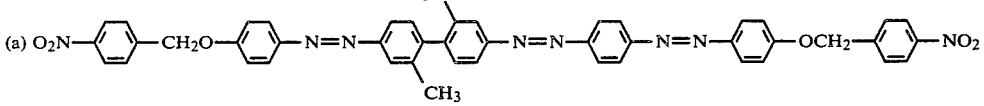 | 0.75 |
| (b) 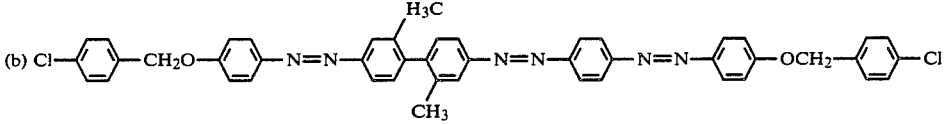 | 0.74 |
| (c) 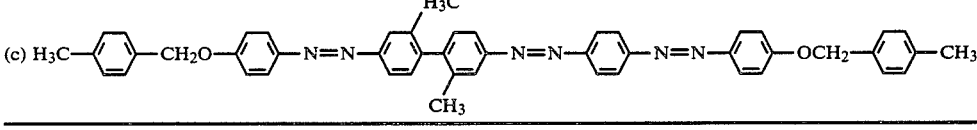 | 0.76 |

R$_7$, R$_8$ denote hydrogen, alkyl, alkyl interrupted by 1–3 non-adjacent O atoms, cycloalkyl, aryl, aralkyl, aralkyl in which the alkyl portion is interrupted by 1–3 non-adjacent O atoms and in the case of —NR$_7$R$_8$ R$_7$, R$_8$ with the inclusion of the N atom can form a 5-membered to 8-membered ring.

I claim:

1. Liquid-crystal material containing 0.01 to 30% by weight of a dyestuff of the formula 2. Liquid-crystal material containing 0.01 to 30% by weight of a azo dyestuff of the formula

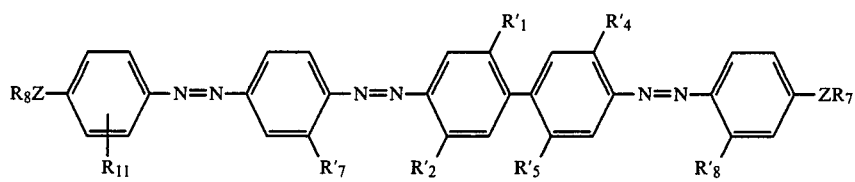

in which
Z denotes an O or S atom and
R'$_1$, R'$_2$, R'$_4$ and R'$_5$ denote chlorine, C$_1$-C$_{10}$-alkyl and C$_1$-C$_{10}$-alkoxy,
R$_7$, R$_8$ denote hydrogen, alkyl, alkyl interrupted by 1-3 non-adjacent O atoms, cycloalkyl, aryl, aralkyl, aralkyl in which the alkyl portion is interrupted by 1-3 non-adjacent O atoms and
R'$_7$, R'$_8$ and R$_{11}$ denote hydrogen, halogen, cyano, nitro, alkyl or alkoxy.

3. Liquid-crystal material containing 0.01 to 30% by weight of an azo dyestuff of the formula

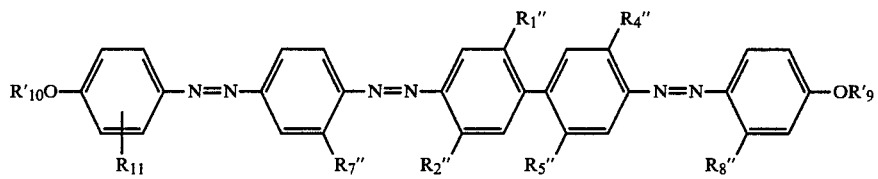

in which

R$_1''$, R$_2''$, R$_4''$ and R$_5''$ denote halogen, hydrogen, C$_1$-C$_4$-alkyl or C$_1$-C$_4$-alkoxy
R'$_9$ and R'$_{10}$ represent C$_1$-C$_4$-alkyl or benzyl which can be substituted in the phenyl nucleus by halogen, C$_1$-C$_4$-alkyl, or C$_1$-C$_4$-alkoxy or represent aminocarbonyl,
R$_7''$ and R$_8''$ denote hydrogen, halogen, C$_1$-C$_4$-alkyl and C$_1$-C$_4$-alkoxy and
R$_{11}$ denote hydrogen, halogen, cyano, nitro, alkyl or alkoxy.

4. Liquid-crystal material according to claim 1, containing mixtures of different dyestuffs.

5. Liquid-crystal material according to claim 1, containing 0.5-5% by weight, of a dyetuff or dyestuff mixture.